UNITED STATES PATENT OFFICE.

ALVIN A. SCHMIDT, OF CHICAGO, ILLINOIS.

PROCESS OF MAKING RESILIENT MOLDS.

960,714.

No Drawing.

Specification of Letters Patent. Patented June 7, 1910.

Application filed September 2, 1909. Serial No. 515,897.

*To all whom it may concern:*

Be it known that I, ALVIN A. SCHMIDT, a citizen of the United States, residing at Chicago, county of Cook, and State of Illinois, have invented new and useful Improvements in Processes of Making Resilient Molds, of which the following is a specification.

My invention relates to an improved process of making resilient molds, especially adapted for use in making concrete or Portland cement castings, and has for its object the production of a mold capable of giving a sharp and clear casting, accurately following the subject or pattern.

My invention consists in the method of procedure hereinafter described and claimed.

In preparing the mold, plastic clay is first applied to the outer surface of the subject or pattern to be cast as uniformly as practicable and substantially one inch thick and a plaster of paris casing applied over this. The casing may, if desired, be made in sections. After the plaster of paris casing has set, the casing with the clay adhering to it is removed from the subject and the clay removed from the plaster casing. The inner surface of this casing is then given a coat of shellac and after this has set, a coat of oil. Then the plaster casing is replaced around the subject or pattern inclosing a space of about one inch around. The mold composition is then poured into this space and allowed to set. This composition consists of 20 pounds of glycerin, 10 pounds of Venice turpentine, 100 pounds of gelatin or fish glue, and 10 pounds of water. In preparing this composition the gelatin or fish glue is boiled in 10 pounds of water in a water bath and the glycerin and turpentine added to it while boiling. This mixture while hot has a consistency about like molasses and when chilled is a solid flexible mass. It should be poured into this space between the subject and plaster casing while still hot and allowed to cool and set. Then the casing and composition mold are removed from the subject and the mold removed from the casing, which may be readily done owing to the shellac and oil on the latter's inner surface. The inner surface of the mold is then washed out with carbon tetra chlorid to remove all oils. Then the inner surface of the mold is treated with a composition made up as follows: 50 pounds of carbon tetra chlorid, 1 pound of para rubber and 5 pounds of French chalk mixed cold for at least three weeks. Two or three coats of this composition should be applied. This composition deposits a rubber like surface on the interior of the mold, the tetra chlorid partially evaporating. Within an hour the interior of the mold is well oiled with pure lard oil and allowed to stand for one hour. By the end of that time the lard oil is completely absorbed. Then the mold is dusted out with French chalk and is ready for use. The mold thus prepared will be found to give clear and sharp castings of concrete, Portland cement or other substances and will not break the casting when setting. The composition of which the mold is made may be used over and over again if desired.

While I have described in detail the preferred steps for carrying my invention into effect these may be varied somewhat while still coming within the scope of the claims.

Having described my invention what I claim as new and desire to secure by Letters Patent is:

1. A process for making resilient molds which consists in placing a casing about the subject to be cast and filling the intermediate space with a hot mixture of glycerin, turpentine, gelatinous matter and water; then washing the interior of the mold with carbon tetra chlorid; and then applying a composition of carbon tetra chlorid, rubber and chalk to the interior of the mold, substantially as described.

2. A process for making resilient molds which consists in placing a casing about the subject to be cast and filling the intermediate space with a hot mixture of glycerin, turpentine, gelatinous matter and water; then washing the interior of the mold with carbon tetra chlorid; then applying a composition of carbon tetra chlorid, rubber and chalk to the interior of the mold; then applying oil to the inner surface of the mold and allowing to stand until the oil disappears and then applying French chalk, substantially as described.

3. A process for making resilient molds which consists in covering the outer surface of the subject with plastic clay, forming a plaster paris casing about the clay and allowing it to set; removing the casing; removing the clay from the casing; coating the inner surface of the plaster casing with shellac and oil; replacing the plaster casing about the subject; filling the space between the plaster casing and the subject with a hot mixture of glycerin, turpentine, gelatinous matter and water and allowing it to cool; removing the plaster casing; removing the composition mold from the plaster casing; washing the inner surface of the mold with carbon tetra chlorid; applying to the inner surface of the mold a solution of rubber, carbon tetra chlorid and chalk and allowing to stand for a time; applying lard oil and allowing to stand for a time and then dusting the interior of the mold with French chalk, substantially as described.

4. A process for making resilient molds which consists in covering the subject with plastic clay; forming a plaster casing about the clay and allowing it to set; removing the casing from the subject; removing the clay from the casing; coating the inner surface of the casing with shellac and oil; replacing the casing about the subject; filling the space between the casing and the subject with a composition consisting of 20 pounds of glycerin, 10 pounds of Venice turpentine, 100 pounds of gelatinous matter and 10 pounds of water; removing the plaster casing from the subject; removing the mold from the plaster casing; washing the interior of the mold with carbon tetra chlorid; applying a solution to the interior of the mold consisting of one pound of para rubber and 5 pounds of French chalk dissolved in 50 pounds of carbon tetra chlorid; allowing the mold to stand until a rubber-like substance is precipitated upon its inner surface; applying pure lard oil to the inner surface of the mold and allowing the mold to stand until the lard oil disappears and then dusting the interior of the mold with French chalk, substantially as described.

In testimony whereof I have signed my name to this specification in the presence of two subscribing witnesses.

ALVIN A. SCHMIDT.

Witnesses:
  HELEN F. LILLIS,
  JOSHUA R. H. POTTS.